May 13, 1941. T. B. TERRY Re. 21,803

NEGLIGEE PANTS

Original Filed June 30, 1939 3 Sheets-Sheet 1

Inventor

TRENT B. TERRY,

By, Bailey & Larson

Attorney

May 13, 1941. T. B. TERRY Re. 21,803

NEGLIGEE PANTS

Original Filed June 30, 1939 3 Sheets-Sheet 2

Inventor

TRENT B. TERRY,

By Bailey & Larson

Attorney

May 13, 1941. T. B. TERRY Re. 21,803

NEGLIGEE PANTS

Original Filed June 30, 1939 3 Sheets-Sheet 3

Inventor

TRENT B. TERRY,

By Bailey & Larson

Attorney

Reissued May 13, 1941

Re. 21,803

UNITED STATES PATENT OFFICE 21,803

NEGLIGEE PANTS

Trent B. Terry, Charlottesville, Va.

Original No. 2,176,826, dated October 17, 1939, Serial No. 282,274, June 30, 1939. Application for reissue August 3, 1940, Serial No. 351,075

7 Claims. (Cl. 2—224)

The present application is a continuation-in-part of prior application Serial No. 187,946 filed January 31, 1938, the disclosure in which forms a part of the present application.

The invention concerns a pair of shorts, which in its preferred form has a plurality of parallel design markings thereon which converge downwardly at the front of the garment and meet at the front median line. While it has long been desirable to devise a pair of shorts having converging designs in front, it has been impossible to manufacture such a garment on a commercial scale until this invention was conceived.

An important object of the invention is thus to provide a pair of shorts formed from a blank of material preferably having a plurality of parallel designs thereon and arranged in such manner that in the completed garment the designs are disposed in symmetrical converging V disposed relationship in the front. Preferably, the blank itself is symmetrical.

Another object is to provide a pair of negligee pants formed of a few pieces of material which may be cut from a single strip of material with a minimum of waste.

Still another object is to provide a pair of negligee pants assembled from a few blanks of material, the blanks being so cut that they may be readily assembled to provide a completed symmetrical garment by comparatively unskilled labor. A cognate object is to provide a pair of negligee pants which may be assembled to provide a completed symmetrical garment without the necessity of skilled fitting or adjustment in assembly.

Yet again, an object of the invention is providing negligee pants having the exposed edge of the fly along the median line of the garment with the converging designs meeting on the median line.

These objectives, along with the intention to provide negligee pants which are easy, simple and economical to manufacture; readily salable; rugged, comfortable and stylish, are attained in the garment, which is described in the following specification and accompanying drawings, in which.

Figure 7:
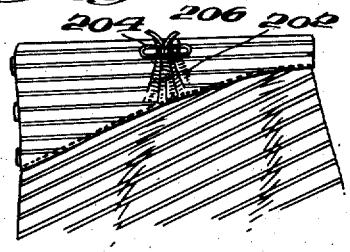

Fig. 7, partially broken away, is a side elevation of another modification.

Figure 1:
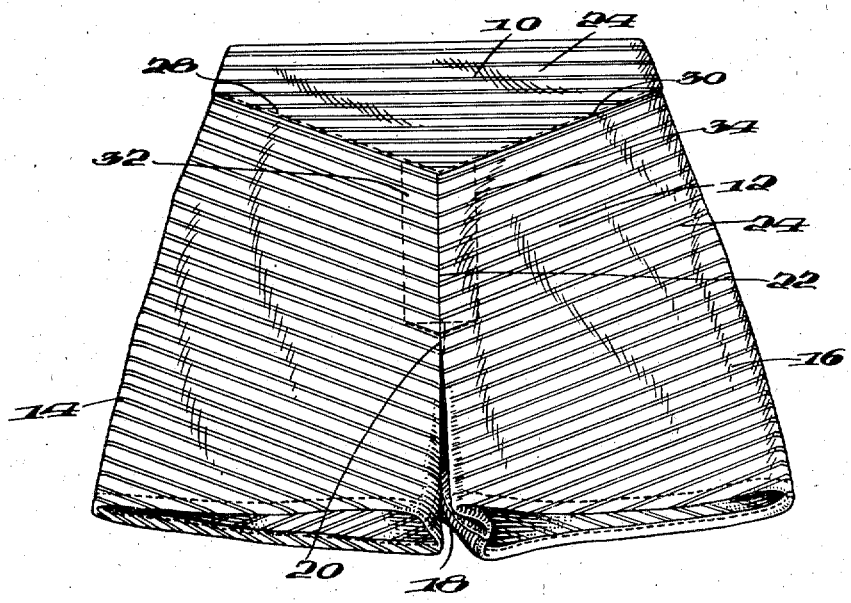
Fig. 1 is a front elevation of the preferred modification.
Figure 2:
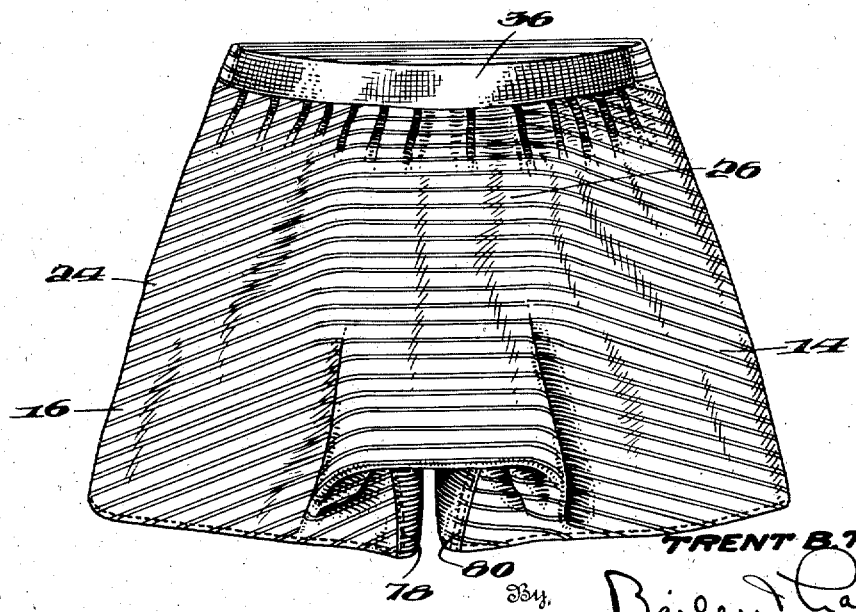
Fig. 2 is a rear elevation of the modification illustrated in Fig. 1.

The preferred form of shorts is shown in Figs. 1 and 2 and is comprised of a waist portion 10, abdominal portion 12, and two leg portions 14 and 16. Extending upwardly from the crotch 18, the front median line seam 20 merges into the exposed edge 22 of the fly.

In its preferred form, the garment is made from woven material having a plurality of parallel designs 24 thereon which converge downwardly to the front median line of the garment and are symmetrically divergent therefrom. In Fig. 2, it is shown that the design markings extend across the seat 26, and on each side of the seat, slope downwardly and outwardly.

These design markings are disposed on the straight of the material, that is, either on the warp or weft. The design markings, while preferably in the form of straight lines, may also be made up of spaced dots or other markings disposed in parallel relation on the straight of the material. Moreover, in its broad concept, the invention may be used with material having no other marking thereon than the indications given by the warp and weft of plain material.

In Figs. 1 and 2, as will be clearly noted, the waist portion 10 is formed of the substantially triangular front waist portion. The lower edges 28 and 30 of the waist portion 10 form substantially the lower edges of the triangle, and are stitched to the main body of the garment on lines substantially parallel with the design markings 24 on the main body of the garment. The significance of this feature will appear later in the specification. Facings 32 and 34 are shown in dotted lines on each side of the fly line in Fig. 1. An elastic belt 36 is stitched to the upper edge of the garment at the rear, the ends of the belt being secured to the ends of the waist portion 10.

One of the dominant features, which characterizes all of the modifications, is shown to good advantage in Figs. 1 and 2, wherein it may be seen that the design markings 24, in the finished garment, converge downwardly in front, meeting at the front median line.

I have found that in a pair of shorts of striped material, for example, two factors are necessary to obtain the desired result. One of these factors, which has just been mentioned, resides in disposing the lower edges 28 and 30 of the waist portion 10 in alignment with the design markings at the top of the main portion of the shorts. The other factor resides in designing the fly of the garment so that the exposed edge in the finished garment is disposed on the front median line of the garment. The fly is of the open type.

These factors will be more apparent from the following description of the blanks from which the garment is made and of the manner in which they are secured together.

Figure 3:
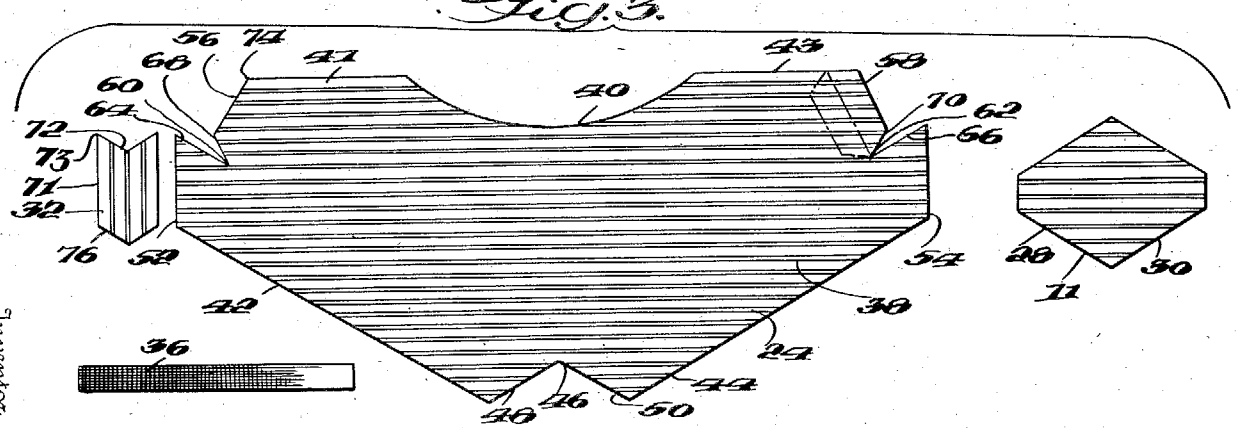
Fig. 3 is a plan view of blanks for forming the main portions of the garments shown in Figs. 1 and 2.

The blank 38, from which the main portions of the garment are made, is shown in Fig. 3. This blank has a concave central portion 40 along the top edge, and top lateral portions 41 and 43 parallel to the design markings 24. The bottom lateral edges 42 and 44 of the blank are disposed on either side of a V-shaped notch 46, which notch is bounded by edges 48 and 50.

Reference numerals 52 and 54 designate the vertical lower edges of the sides of the blank, respectively, and the numerals 56 and 58 designate, respectively, the inclined side edges of the upper part of the blank. Between the upper and lower side edge portions on each side are disposed notches 60 and 62. The lower edges of these notches in the drawings bear reference numerals 64 and 66, while the upper edges are numbered 68 and 70, respectively. The material along the edges of the notches comprises intermediate side edge portions.

To the side of the main blank shown in Fig. 3, a fly facing piece 32 is shown.

In making the garment illustrated in Figs. 1 and 2, two other pieces are necessary. They are the diamond shaped waist portion 11 for the front, and the elastic waist band for the back. The waist portion 10 is formed by folding the diamond shaped waist piece 11 longitudinally through the middle to form a triangle.

In constructing the main portion of the garment described, the fly facing 32 is stitched to the main blank 38 in the following manner. The facing piece 32 is stitched on the blank 28 so that the edge 71 lies along the edge 56 and the edge 76 lies along the edge 68 of the notch. The point 73 then extends upwardly from the point 74. On the opposite side of the blank, the portion extending upwardly from notch 62 is folded backwardly, and edge 58 is stitched to the blank, which, in folded position, it overlaps. In Fig. 3 the position after folding is indicated in dot and dash lines. In this manner the edges adjacent the fly opening of the shorts are faced.

The elastic band 36 is then stitched to the upper concave edge 40 of the main blank. The sides of the main blank are next folded inwardly and the lower edges 28 and 30 of the waist front piece 10 are stitched to the top lateral portions 41 and 43 respectively of the main blank parallel to the top edges along the design lines and the edge 72 of the facing piece 32. Symmetrical alignment of the design is assured at this point simply by lining up the lower edges of the waist front piece so that they extend substantially parallel with the design lines 24 on the blank. Where no design lines are present, these edges are lined up with the top lateral straight edges of the main blank 41 and 43, or the warp or weft disposed parallel thereto.

In the next operation, the lower edges 64 and 66 of notches 60 and 62, respectively, are joined to provide the front median line seam, designated in Fig. 1 by the reference numeral 20. Then the edge 52 is stitched to edge 48, and edge 54 is stitched to edge 50 to form the legs. The seams thus formed are indicated at 78 and 80 in Fig. 2.

The remaining unfinished edges of the garment are felled, and after the lower edges of the legs have been hemmed, the garment is completed.

Figure 4:
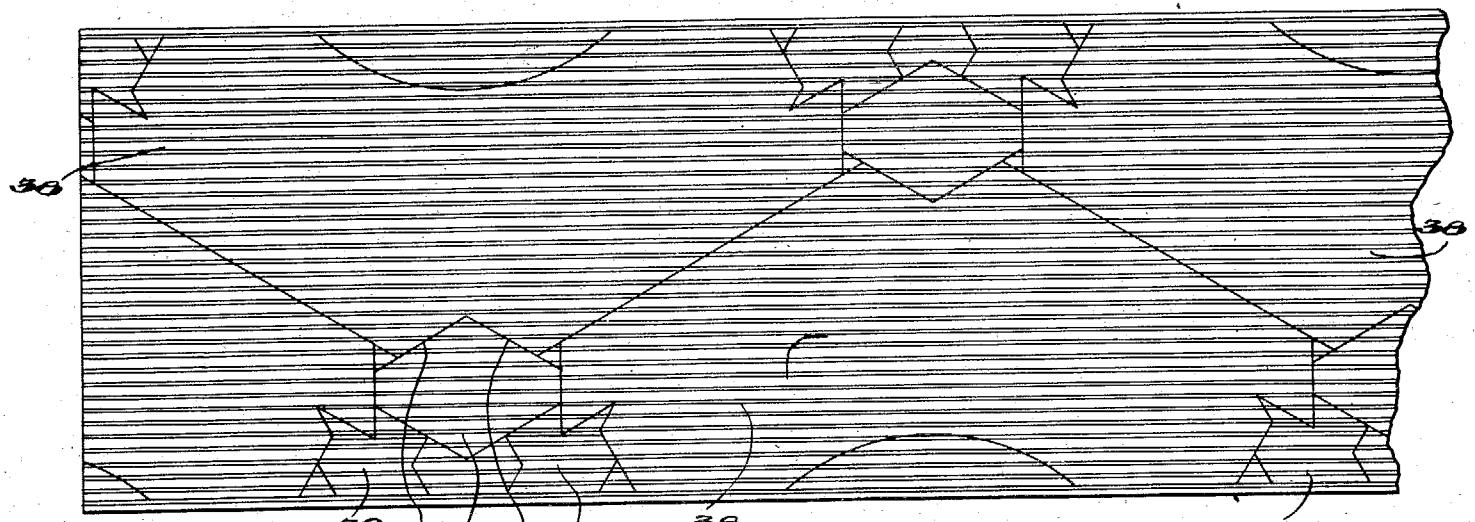
Fig. 4 is a plan view of a single strip of material, marked for cutting blanks for forming the garment shown in Figs. 1 and 2.

Blanks for forming the garment just described are especially easy to cut from a single blank of material with a minimum of waste, and with certainty of result. In Fig. 4 a strip of material marked for cutting is shown, wherein successive main blanks 38 are marked on the material strip. Blanks 11, which when folded form waist pieces 10, are marked between successive main blanks, and when the edges 48 and 50 of each main blank 38 are cut, the edges of the waist blank 11 are simultaneously cut. Facing strips 32 are also arranged between the successive main blanks 38. The compact arrangement thus provided results in a minimum of waste material.

The use of symmetrical blanks makes possible a disposition of the blanks so that many of the blanks have one edge in common with another blank, thus eliminating many steps in cutting, since cutting along one line frequently cuts two blanks which, but for relatively little trimming, are in form for assembling.

It will be noted that every line of each blank, other than those parallel, or at right angles, to the design markings 24, is disposed at 30° to the design markings. This is true with but one exception, which is the angle of the notches 60 and 62 in the side edges of the main blank 38, which angle is a 60° angle. This arrangement of angles is believed to be novel, and contributes to the waste-saving disposition of the blanks on the material from which they are to be cut.

As shown in Fig. 1, the leg portions of the garments thus formed fall naturally below the crotch portions 18 so that the theme of the converging V of the design markings is maintained throughout the front of the garment.

Figure 5:
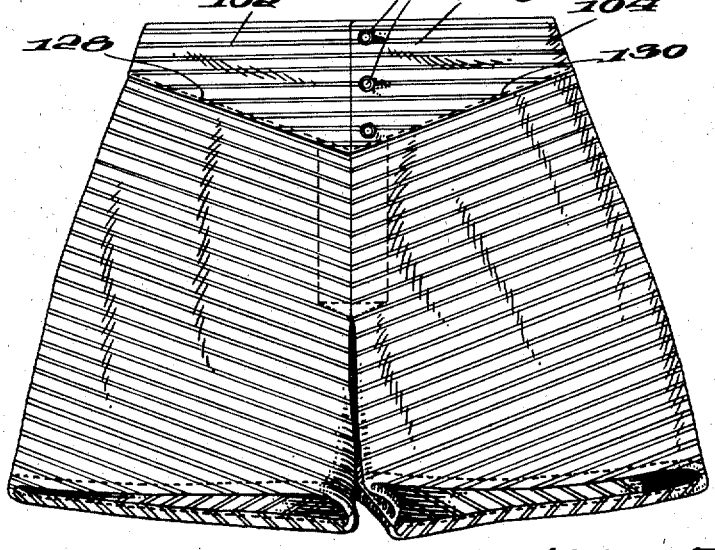
Fig. 5 is a front elevation of a second modification.
Figure 6:
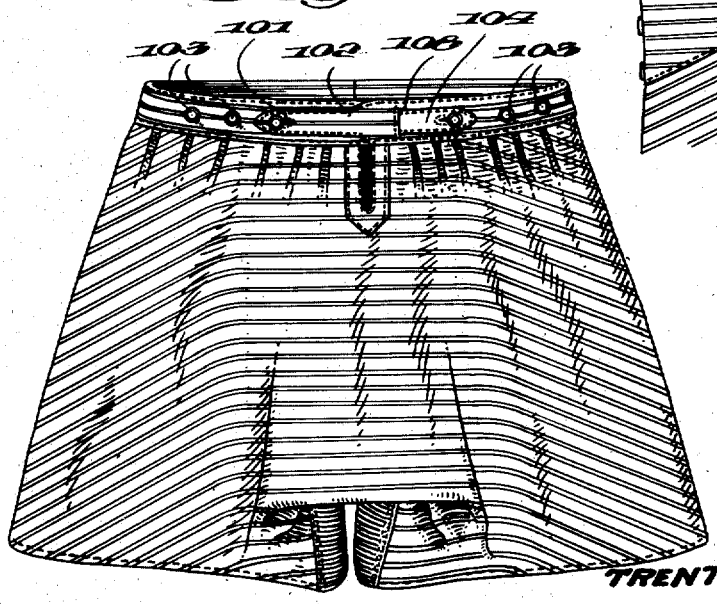
Fig. 6 is a rear elevation of the second modification shown in Fig. 5.

Other modifications of the garment are illustrated in Figs. 5, 6 and 7.

In Figs. 5 and 6 the front and back of a "French back" type garment are shown. The waist band portion 100 in this garment is composed of two portions 102 and 104 which are secured to the main body of the shorts by stitching at all points except on the median line at the front and back. In the front the stitching of each portion is along the lines 128 and 130. The only differences between this form and that shown in Figs. 1 and 2 are, first, that the waist band is divided vertically in front with the parts thereof being detachably secured by buttons 106 or other fastening means. Secondly, in the rear, the two portions of the waist band overlap with one portion passing through a slot 108 in the other. The size of the waist of the garment can be adjusted by changing the amount of the overlap, and then securing the portions together by engaging the button holes 101 on conveniently spaced buttons 103. Obviously, other types of adjustable fastening means can be employed within the spirit of the invention.

In Fig. 7 the adjustment of the waist is accomplished by forming a tab 202 in the sides by drawing the strings 204, 206 together and then by tying them. In the front, the embodiment is similar to that shown in Fig. 5, while in the rear, the waist band is formed of a continuous piece of non-elastic material (not shown), as is quite common in the art.

In all modifications, it is important to note that the converging V formation of the design lines, or of the straight of the material, is effected principally through the medium of two factors. First, the lower edges of the waist band are secured along lines parallel to the design markings on the main blank or to the straight of the material. Secondly, the fly is arranged so that its exposed edge is disposed on the front median line of the garment. In the embodiment of Figs. 5 and 6, the division line of the waist in front is also on the front median line.

It is readily apparent from the foregoing specification and drawings that garments embodying the invention are extremely simple to cut and assemble, and that the completed garment will always be in proper symmetrical form. Moreover, and this is most important, the design markings will converge symmetrically along the front median line of the garment.

It is not intended to limit the invention by the specific examples set forth, and full scope is to be afforded the invention defined in the following claims.

I claim:

1. Negligee pants formed of material having parallel design lines thereon on the straight of the material in one direction, said pants being cut from a blank the top edge of which is cut with a central portion and a lateral portion at each side thereof, the side edges of said blank being formed with cut outs, the portions of said side edges above the cut outs being faced, the material along the lower edges of said cut outs being stitched together to form the lower part of the front median line of said pants, the faced portions of the side edges forming the fly portion of said pants, one edge overlapping the other, the exposed edge of the overlapping side being in alignment with said median line forming a continuation of the same, and whereby the opposite ends of said design lines converge at the front median line of said pants, and a substantially triangular insert having a downwardly disposed apex, the lower edges of which insert are secured to the lateral portions of the top of said blank parallel with a design line of the material to provide the front waist portion of said pants and to hold the overlapping portion of the fly with the exposed edge on the median line.

2. Negligee pants formed of a blank of material having parallel design lines thereon, said blank having a top edge comprising a central edge portion and a lateral edge portion at each side of said central edge portion, the lateral edge portions being substantially parallel to said design lines, the side edges of said blank being formed with cut outs, the portions of the side edges above the cut outs being faced, the material along the lower edge of the cut outs being stitched together to form the lower part of the front median line of said pants, the faced portions of the side edges forming the fly portion of said pants, one edge overlapping the other, the exposed edge of the overlapping side being in substantial alignment with said median line and forming a continuation of the same, whereby the design lines converge at the frontal median line of said pants, and a substantially triangular insert having a downwardly disposed apex, the lower edges of which insert are secured to the lateral portions of the top edge of said blank parallel to the design lines to provide the front waist portion of said pants and whereby to hold the overlapping portion of the fly with the exposed edge on the median line.

3. Negligee pants formed of a blank of woven material having a top edge comprising a central edge portion and a lateral edge portion at each side of said central edge portion, the side edges of said blank being formed with cut outs, the portions of the side edges above the cut outs being faced, the material along the lower edge of the cut outs being stitched together to form the lower part of the front median line of said pants, the faced portions of the side edges forming the fly portion of said pants, one edge overlapping the other, the exposed edge of the overlapping side being in substantial alignment with said median line and forming a continuation of the same, and a substantially triangular waist portion having a downwardly disposed apex, the lower edges of which waist portion are secured to the lateral portions of the top edge of said blank along the straight of the material to provide the front waist portion of said pants and to hold the overlapping portion of the fly with the exposed edge on the front median line and to dispose the straight of the material on lines converging downwardly and meeting in V formation at the front median line.

4. Negligee pants formed of a blank of woven material having designs thereon disposed along lines parallel to one another, said blank having a top edge comprising a central edge portion and a lateral edge portion at each side thereof, the side edges of said blank being formed with cut outs, the portions of said side edges above the cut outs being faced, the material along the lower edges of said cut outs being stitched together to form the lower part of the front median line of said pants, the faced portions of the side edges forming the fly portion of said pants, one edge overlapping the other, the exposed edge of the overlapping side being in alignment with said median line forming a continuation of the same, and whereby the opposite ends of said lines of design converge at the front median line of said pants, and a substantially triangular insert having a downwardly disposed apex, the lower edges of which insert are secured to the lateral portions of the top of said blank parallel with a line of design of the material to provide the front waist portion of said pants and to hold the overlapping portion of the fly with the exposed edge on the median line.

5. In a pants garment, at least one piece of woven fabric forming blank means having a bottom edge, lower and upper side edges, the horizontal dimensions of the blank means extending substantially parallel to the design lines of the fabric adjacent the sides, said upper side edges being convergent upwardly, means connecting said lower side edges to central portions of the bottom edge to form seat, crotch and leg regions of the garment, said upper side edges lying adjacent one another with the design lines of the fabric forming downwardly converging V's, the fabric forming said V's being relatively stretchable horizontally, at least one of said upper side edges of the blank means forming an exposed edge substantially along the median line of the garment, said garment having a waistband extending substantially horizontally of the waist of the wearer and secured to the upper portion of said blank means and extending between the arms of at least one of said V's, said waistband being relatively non-stretchable horizontally.

6. In a pants garment, at least one piece of cloth fabric forming blank means having a bottom edge, and lower and upper side edges, the horizontal dimensions of the blank means extending substantially parallel to the design lines of the fabric adjacent the sides, said upper side edges being convergent upwardly, means connecting said lower side edges to central portions of the bottom edge to form seat, crotch, and leg regions of the garment, said upper side edges lying adjacent one another with the design lines of the fabric forming downwardly converging V's, at least one of said upper side edges of the blank means forming an exposed edge substantially along the median line of the garment, said garment having a waistband secured to the upper portion of said blank means, the design lines of the material of the waistband extending substantially horizontally of the waist of the wearer.

7. Negligee pants formed of at least one piece of woven material having parallel design lines thereon on the straight of the material, said material forming blank means, the top edge of which blank means having a central concave portion and a lateral portion at each side thereof, the lateral portions extending along the straight of the material, the side edges of said blank means being formed with cut-outs, the portions of the side edges above said cut-outs being faced, the faced portions of the side edges forming the fly portion of said pants, one edge overlapping the other, the exposed edge of the overlapping side extending along the median line of said pants, whereby the ends of said design lines converge at the front median line of said pants, means connecting the side edges of the blank means below the cut-outs and central portions of the bottom edge of the blank means to form seat, crotch, and leg regions of the garment, and a substantially triangular insert having a downwardly disposed apex, the lower edges of which insert are secured to the lateral portions of the top of said blank means parallel with the design lines of the material adjacent said lateral portions to provide the front waist portion of said pants.

TRENT B. TERRY.